(12) United States Patent
Brewer et al.

(10) Patent No.: US 6,199,371 B1
(45) Date of Patent: Mar. 13, 2001

(54) THERMALLY COMPLIANT LINER

(75) Inventors: Keith S. Brewer, North Palm Beach; Gary F. Chaplin, Palm Beach Gardens; David R. Olsen, Wellington, all of FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/173,020

(22) Filed: Oct. 15, 1998

(51) Int. Cl.[7] ...................................................... F02K 3/10
(52) U.S. Cl. .............................................. 60/261; 60/39.32
(58) Field of Search ............................ 60/261, 752, 756, 60/757, 39.32

(56) References Cited

U.S. PATENT DOCUMENTS

| | | | |
|---|---|---|---|
| 3,712,062 | 1/1973 | Nash | 60/261 |
| 3,826,088 | 7/1974 | Nash et al. | 60/261 |
| 4,696,431 | 9/1987 | Buxe | 239/265.15 |
| 4,718,230 | 1/1988 | Honeycutt, Jr. et al. | 60/261 |
| 4,854,122 | 8/1989 | Belling | 60/261 |
| 4,864,818 * | 9/1989 | Taylor | 60/261 |
| 4,866,942 | 9/1989 | Belling | 60/752 |
| 4,878,283 | 11/1989 | McLean | 29/163.6 |
| 5,067,324 | 11/1991 | Beytes et al. | 60/752 |
| 5,144,795 | 9/1992 | Field | 60/226.1 |
| 5,201,887 | 4/1993 | Bruchez, Jr. et al. | 60/261 |
| 5,323,601 | 6/1994 | Jarrell et al. | 60/39.31 |
| 5,333,816 | 8/1994 | Del Monte | 244/50 |
| 5,337,583 | 8/1994 | Giles et al. | 60/752 |
| 5,524,438 | 6/1996 | Johnson et al. | 60/747 |
| 5,557,932 * | 9/1996 | Nash | 60/266 |
| 5,560,198 | 10/1996 | Brewer et al. | 60/261 |
| 5,596,870 | 1/1997 | Dillard et al. | 60/39.02 |
| 5,697,213 | 12/1997 | Brewer et al. | 60/261 |
| 5,704,208 | 1/1998 | Brewer et al. | 60/261 |
| 5,782,294 | 7/1998 | Froemming et al. | 165/168 |
| 6,041,590 * | 3/2000 | Hayton et al. | 60/261 |

* cited by examiner

Primary Examiner—Timothy S. Thorpe
Assistant Examiner—David J. Torrente
(74) Attorney, Agent, or Firm—Monica Krasinski

(57) ABSTRACT

The present invention relates to a thermally compliant liner for a gas turbine engine. The liner includes an outer wall, an inner wall spaced radially inwardly from the outer wall leaving a duct therebetween. A plurality of stiffeners are disposed in the duct. The stiffeners include a flexible medial portion which accommodates differential rates of thermal growth between the outer and inner walls. The stiffeners also include radially extending portions which in conjunction with the medial portion, minimize buckling of the liner due to pressure differentials.

2 Claims, 1 Drawing Sheet

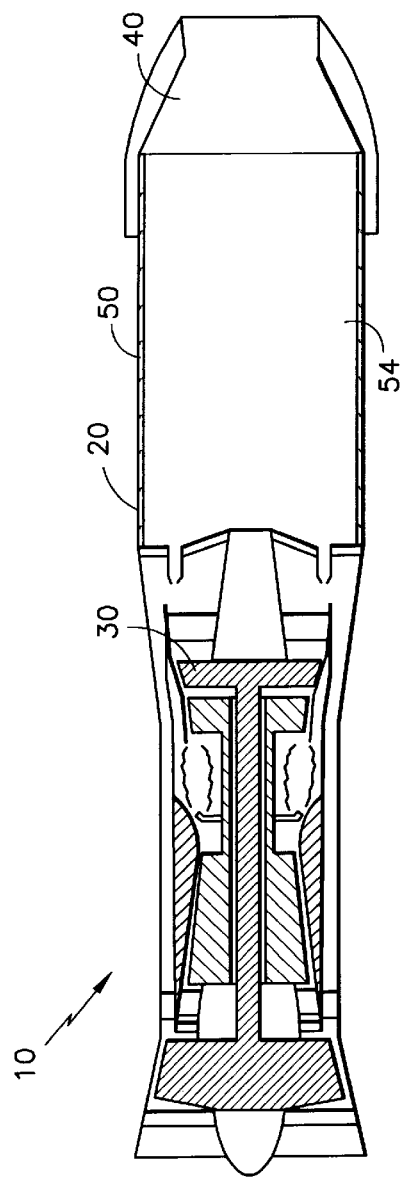
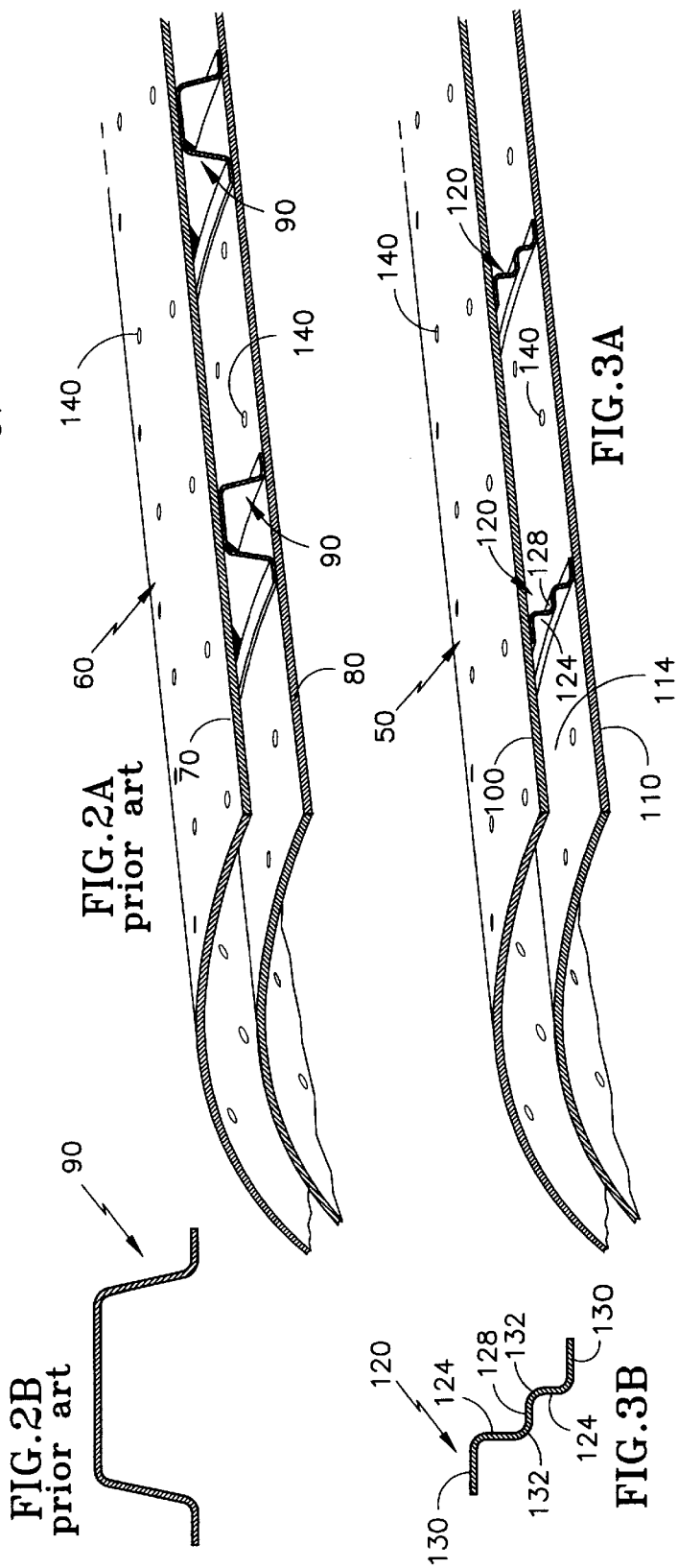
FIG.1
FIG.2A prior art
FIG.2B prior art
FIG.3A
FIG.3B

THERMALLY COMPLIANT LINER

TECHNICAL FIELD

This invention relates to gas turbine engines in general, and in particular to the structure of thermal protection liners within gas turbine engines.

BACKGROUND ART

Liners are often employed in gas turbine engines to enclose high temperature, core gas paths. An augmentor which forms an additional combustion chamber for afterburning the gas turbine exhaust, may use a cylindrical liner to define a flow path for the core gas flow from the turbine to the exhaust nozzle. The liners within the augmentor duct protect the duct from excessive temperatures associated with the turbine exhaust.

Liners typically include an outer wall, an inner wall and a means for spacing the two walls a distance apart. A duct defined by such spaced walls is used as a cooling air passage. Cooling air is supplied between the liner walls for convection cooling of the liner. Cooling air also flows inwardly through perforations in the outer wall of the liner to provide impingement cooling of the inner surface of the inner wall of the liner. Perforations in the inner wall of the liner provide a path for the cooling air to exit into the core gas flow.

It is known to provide liners with stiffening structure ("stiffeners") extending between the two walls to maintain spacing the two walls a distance apart. Fasteners attach the stiffeners and the walls together and collectively the stiffeners and the fasteners form a rigid cylindrical structure. Stiffeners protect the liners from buckling or collapsing under differential pressure loads between the outer and inner walls. For example, a significant pressure difference exists across the liner during stall conditions. During a stall condition, a higher pressure exists surrounding the outer wall of the liner relative to the pressure on the inner liner wall. This creates a tendency for the liner to collapse or buckle under the external loading. The sizing of the perforations in the inner and outer liner walls do not allow for enough air flow to form the outer to the inner liner wall to diffuse the pressure loading across the liner walls.

Further, high core gas temperatures can also limit the useful life of the augmentor liner. The inner wall of the liner may operate on the order of 500 degrees Fahrenheit hotter, than the surrounding outer wall of the liner. Cooling schemes such as described hereinabove and thermal barrier coatings are typically used to provide cooling to decrease the rate of thermal damage to the liner walls but do not solve the problem caused by the differential thermal growth of the liner walls.

The stiffeners in the liners of the prior art design provide a very stiff structure that results in low cycle fatigue problems for the liner. In addition, due to differential thermal growth and movement between the outer wall and the inner wall of the liner, the liner experiences undesirable stress. There is a high probability that the stress will result in cracks in the coating disposed on the inner wall of the liner. The stress and cracks compromise the durability of the liner.

DISCLOSURE OF THE INVENTION

A primary object of the present invention is to provide a thermally compliant liner.

A further object of the present invention is to provide a liner with adequate stiffness.

According to the present invention, a liner for a gas turbine engine includes a stiffener having a flexible or pliant medial portion to accommodate differential rates of thermal growth between the outer and inner walls of the liner and radially extending sections to prevent buckling of the double wall liner due to pressure differentials between the inner or outer walls.

The length of the flexible medial portion of the stiffener is determined by the need for the required stiffness provided primarily by the radially extending sections of the stiffener. The number of stiffeners is determined based on pressure loading requirements for particular engine designs and the length of the liner.

The liner of the present invention is durable, having a required stiffness to alleviate any cycle fatigue problems. The liner of the present invention accommodates the different rates of thermal growth of the outer wall and inner wall.

A still further advantage of the present invention is that the thermal barrier coating remains more readily adhered to the surface of the liner walls as compared to the liner walls of the prior art. The inner wall sections are less apt to significantly warp due to thermal loads because they may expand more readily than the prior art liner walls. Reducing the warpage helps minimize stress between the coating and the inner wall of the liner. Overstress frequently results in coating separation from the inner wall.

The foregoing and other objects, features and advantages of the present invention will become more apparent in the following detailed description of the Best Mode for Carrying Out The Invention and from the accompanying drawings, which illustrate an embodiment of the invention.

BRIEF DESCRIPTION OF THE DRAWINGS

FIG. 1 is an illustration of a gas turbine engine having an augmentor incorporating the liner of the present invention;

FIG. 2A is an isometric, sectional view of a liner of the prior art;

FIG. 2B is a sectional view of the liner stiffener of the prior art as shown in FIG. 2A;

FIG. 3A is an isometric, sectional view of the liner of the present invention and;

FIG. 3B is a sectional view of the liner stiffener of the present invention as shown in FIG. 3A.

BEST MODE FOR CARRYING OUT THE INVENTION

Referring to FIG. 1, a gas turbine engine 10 includes an augmentor 20 disposed between the turbine section 30 and a nozzle 40. A thermal liner 50 is disposed in the augmentor duct 54 to direct core gas flow between the turbine exhaust and the nozzle.

Referring to FIGS. 2A and 2B, a liner 60 of the prior art for a gas turbine augmentor 20 includes an outer wall 70, an inner wall 80 spaced radially inwardly from the outer wall. A plurality of inverted U-shaped stiffeners 90 are disposed between the walls. Each stiffener 90 extends circumferentially along the augmentor duct 54. The stiffeners are brazed to both the hot (inner) 80 and cold (outer) 70 walls. The two sides of the U-shaped stiffeners provide the stiffening required to preclude buckling or collapsing of the liner walls due to differential pressure gradients that exist across the liner. However, these U-shaped stiffeners, made of Inconel™ 625, provide a very taut structure that results in an inadequately pliant liner. This liner of the prior art, as a result of the excessive rigidity of the stiffeners, has low cycle fatigue problems. The inadequately pliant stiffeners of the prior art cannot accommodate the differential thermal growth and resultant movement between the outer wall and the inner wall of the liner. Thus, there is a high probability that undesirable stresses in the liner will result in cracks in the material of the liner walls and coating disposed on the surface of the inner wall of the liner. The stresses and potential cracking compromise the durability of the liner of the prior art.

Referring to FIGS. 3A and 3B, an embodiment of the liner 50 of the present invention includes an outer wall 100 and an inner wall 110 spaced radially inwardly from the outer wall leaving a duct 114 therebetween. The liner 50 further includes stiffeners 120 in the duct 114. The stiffeners 120 have radially extending end portions 124 and a flexible medial portion or web 128 as shown more clearly in FIG. 3B. The radially extending portions 124 are attached by being brazed to the hot wall 110 and the cold wall 100 at the sections 130 forming a lap joint. The radially extending portions primarily provide the required buckling stiffness. A portion of the pressure loading is transmitted to the flexible medial portion. The transition areas 132 between the radially extending sections 124 and the longitudinally extending, flexible medial portion 128 bend to accommodate the thermal growth of the hot inner wall 110 of the liner 50 and pressure loading across the liner.

The material used for the stiffeners 120 of the preferred embodiment is Inconel™ 625. In an embodiment of the present invention, the outer and inner walls of the liner are also formed from Inconel™ 625. It has been known that Inconel™ 625 stiffeners provide adequate stiffness to the liner.

In operation, the liner 50 of the present invention allows for thermal growth to be accommodated by the longitudinally extending, flexible medial portion 128 of the stiffener 120. Hot core gases heat up the inner wall sections 110 of the liner. Any thermal growth of the inner wall is accommodated by the bend radii 132 associated with the transition areas 132 present in between the flexible medial portion 128 and the radially extending 124 portions of the stiffener 120. As the hot wall 110 of the liner grows, the flexible medial portion of the stiffener expands and pivots about the bend radii 132 thus accommodating for the thermal growth in the hot side 110 without affecting the outer cold side 100 of the liner 50. The cold wall typically grows at a slower thermal rate than the hot wall. Thus, the flexible medial portion 128 provides for an isolation mechanism between the thermal growth differentials of the hot and cold walls.

The radially extending portions 124 of the liner 50 of the present invention primarily provide the required stiffness to prevent the liner from buckling. Pressure loads are transmitted and accommodated by the medial portion. The length of the flexible medial portion 128 of the stiffener 120 is determined so as not to detract from the impingement cooling scheme for cooling the hot side 110 of the liner wall. It is known to have perforations 140 in the surface of the outer and inner walls of the liner. Cooling air is provided to the surface of the inner wall of the liner. Cooling air flows radially inwardly through the perforations 140 in the outer wall of the liner and impinges on the hot surfaces of the inner wall. The length of the flexible medial portion is determined to minimize the interference to this impingement cooling scheme. Manufacturing and weight concerns are also a factor in determining the length of the flexible medial portion. The number of stiffeners required in a liner design is based on pressure loading concerns and the length of the liner.

The liner 50 of the present invention may be implemented in a variety of ways. As described hereinbefore, the liner of the present invention may use different numbers or lengths of the flexible medial portions 128 to isolate the thermal deflection or growth between the inner and outer walls of the liner. The number of stiffeners is determined for different engine designs based on different pressure loading criteria and the length of the liner.

It will be understood by those skilled in the art that the above-described embodiment is experimentally derived for particular engine types. The lengths, the numbers and the shape of the liner stiffeners, of course, may be adjusted to suit any implementation and utilization of the invention.

All of the foregoing changes and embodiments are representative of the preferred embodiment, it suffices for the present invention that a liner 50 includes a stiffener 120 to prevent buckling of the double wall construction and incorporates a flexible medial portion 128 to accommodate differential thermal growth rates in the hot or cold walls.

Although the invention has been shown and described with respect to a detailed embodiment thereof, it should be understood by those skilled in the art that various changes in form and detail thereof may be made without departing from the spirit and the scope of the claimed invention.

What is claimed is:

1. A liner for an augmentor of a gas turbine engine, comprising:
    an outer wall;
    an inner wall, spaced radially inwardly from the outer wall defining a duct therebetween; and
    a plurality of stiffeners disposed in the duct, each of said stiffeners including radially extending, inner and outer end portions attached to said inner and outer walls respectively, and a medial portion between said end portions, said medial portion having a pliant section wherein the pliant medial section of the stiffeners accommodates differential rates of thermal growth between the outer and inner wall and said inner and outer radially extending, end portions resist buckling of the walls due to pressure gradients.

2. The augmentor liner of claim 1 wherein said pliant medial section comprises a web generally parallel to the inner and outer walls and bend radii at opposite axial ends thereof, joining said radial extending end portions to said web.

* * * * *